United States Patent
Palanki et al.

(10) Patent No.: US 9,084,283 B2
(45) Date of Patent: Jul. 14, 2015

(54) PEER-TO-PEER COMMUNICATION USING A WIDE AREA NETWORK AIR INTERFACE

(75) Inventors: Ravi Palanki, San Diego, CA (US);
Naga Bhushan, San Diego, CA (US);
Aamod D. Khandekar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 547 days.

(21) Appl. No.: 12/621,083

(22) Filed: Nov. 18, 2009

(65) Prior Publication Data

US 2010/0136997 A1 Jun. 3, 2010

Related U.S. Application Data

(60) Provisional application No. 61/116,067, filed on Nov. 19, 2008.

(51) Int. Cl.
*H04B 7/00* (2006.01)
*H04W 88/04* (2009.01)
*H04W 72/04* (2009.01)
*H04W 76/02* (2009.01)

(52) U.S. Cl.
CPC .............. *H04W 88/04* (2013.01); *H04W 72/04* (2013.01); *H04W 76/023* (2013.01)

(58) Field of Classification Search
CPC . H04W 76/023; H04W 72/082; H04W 92/18; H04W 4/008; H04W 52/243; H04W 72/121; H04W 76/043
USPC ............... 455/41, 2, 502, 509, 515, 516, 517, 455/41.2, 11.1, 13.1; 370/206, 277, 278, 370/324, 328, 329, 338, 350
See application file for complete search history.

(56) References Cited

U.S. PATENT DOCUMENTS

| | | | |
|---|---|---|---|
| 6,415,146 B1 | 7/2002 | Capece | |
| 2005/0025181 A1* | 2/2005 | Nazari | ........................ 370/469 |
| 2008/0002658 A1 | 1/2008 | Soliman | |
| 2008/0273610 A1* | 11/2008 | Malladi et al. | ................ 375/260 |

(Continued)

FOREIGN PATENT DOCUMENTS

| CN | 101102598 A | 1/2008 |
|---|---|---|
| EP | 1079651 A1 * | 2/2001 |
| EP | 1079651 A1 | 2/2001 |

(Continued)

OTHER PUBLICATIONS

Cassio Ribeiro, Juha Korhonen, Pekka Janis, Klaus Doppler, Carl Wijting, Olav Tirkkonen, Klaus, Hugl: Method and Apparatus for Providing Interference measurements for Device to Device Communication. Filed Sep. 12, 2008 Prepared by Ditthavong Mori & Steiner, P.C. U.S. Appl. No. 61/096,580; All pages pertinent.*

(Continued)

*Primary Examiner* — Kiet Doan
*Assistant Examiner* — Dung Lam
(74) *Attorney, Agent, or Firm* — Liem T. Do

(57) ABSTRACT

A method for peer-to-peer wireless communication by a first user equipment (UE) includes communicating with a second UE, and using a wireless area network air interface during the communication with the second UE. The communicating with the second UE comprises transmitting a downlink signal configured for downlink of the wireless area network air interface.

40 Claims, 12 Drawing Sheets

(56) References Cited

U.S. PATENT DOCUMENTS

| | | | |
|---|---|---|---|
| 2010/0093364 A1* | 4/2010 | Ribeiro et al. | 455/452.2 |
| 2011/0034145 A1* | 2/2011 | Youn et al. | 455/404.1 |

FOREIGN PATENT DOCUMENTS

| | | |
|---|---|---|
| JP | 2006501777 A | 1/2006 |
| TW | 200816688 A | 4/2008 |
| TW | 200845643 A | 11/2008 |
| WO | WO-02067606 A2 | 8/2002 |
| WO | 2004032536 | 4/2004 |

OTHER PUBLICATIONS

International Search Report—PCT/US2009/065191—International Search Authority, European Patent Office, Mar. 29, 2010.

Taiwan Search Report—TW098139368—TIPO—Feb. 4, 2013.

Written Opinion— PCT/US2009/065191 — ISA/EPO— Mar. 29, 2010 (082476WO).

* cited by examiner

PEER-TO-PEER COMMUNICATION USING A WIDE AREA NETWORK AIR INTERFACE

CROSS-REFERENCE TO RELATED APPLICATION(S)

Pursuant to 35 U.S.C. §119(e), this application claims the benefit of U.S. Provisional Application Ser. No. 61/116,067 filed on Nov. 19, 2008, the contents of which are hereby incorporated by reference herein in their entirety.

BACKGROUND

1. Field

The present disclosure relates generally to wireless communication devices, and more particularly, to systems and methods for enabling peer-to-peer communication using a wide area network (WAN) interface.

2. Background

Wireless communication systems are widely deployed to provide various telecommunication services such as telephony, video, data, messaging, and broadcasts. Typical wireless communication systems may be multiple-access systems capable of supporting communication with multiple users by sharing available system resources (e.g., bandwidth, transmit power). Examples of such multiple-access systems include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems. The systems can conform to specifications of the Third Generation Partnership Project (3GPP), such as, for example, 3GPP Long Term Evolution (LTE). LTE is a set of enhancements to the Universal Mobile Telecommunications System (UMTS) mobile standard in order to improve spectral efficiency, lower costs, improve services, make use of new spectrum, and better integrate with other open standards.

Generally, wireless multiple-access communication systems may simultaneously support communication for multiple user equipment (UE). Each UE may communicate with a base station (BS) via transmissions on forward and reverse links. The forward link (or downlink (DL)) refers to the communication link from the BSs to UEs, and the reverse link (or uplink (UL)) refers to the communication link from UEs to the BSs. Communications between UEs and BSs may be established via single-input single-output (SISO) systems, single-input multiple-output (SIMO) systems, multiple-input single-output (MISO) systems, multiple-input multiple-output (MIMO) systems. UEs can communicate with other UEs (and/or BSs with other BSs) in peer-to-peer (P2P) wireless network configurations.

In a P2P system, two UEs may communicate with each other directly without communicating with a BS in a wide area network (WAN). Current P2P systems use an air interface different from the WAN. Different air interfaces for P2P and WAN communication can create issues of interoperability when P2P communication occurs in the same spectrum as WAN communication, as the P2P devices may interfere with WAN communication and vice versa. The interference may be unpredictable if the numerology of the two systems is not aligned. Furthermore, existing devices that are capable of both WAN and P2P technologies need to implement two different air interfaces, which increases complexity and cost.

As such, there is a need to address the interoperability with P2P and WAN communication.

SUMMARY

In an aspect of the disclosure, a method for peer-to-peer wireless communication by a first user equipment (UE) includes communicating with a second UE, and using a wireless area network air interface during the communication with the second UE. The communicating with the second UE includes transmitting a downlink signal configured for downlink of the wireless area network air interface.

In an aspect of the disclosure, a method for peer-to-peer wireless communication by a first user equipment (UE) includes communicating with a second UE, and using a wireless area network air interface during the communication with the second UE. The communicating with the second UE includes processing received uplink signals configured for uplink of the wireless area network air interface.

In an aspect of the disclosure, an apparatus for peer-to-peer wireless communication by a first user equipment (UE) includes means for communicating with a second UE, and means for using a wireless area network air interface during the communication with the second UE. The means for communicating with the second UE transmits a downlink signal configured for downlink of the wireless area network air interface.

In an aspect of the disclosure, an apparatus for peer-to-peer wireless communication by a first user equipment (UE) includes means for communicating with a second UE, and means for using a wireless area network air interface during the communication with the second UE. The means for communicating with the second UE processes received uplink signals configured for uplink of the wireless area network air interface.

In an aspect of the disclosure, a computer program product for peer-to-peer wireless communication by a first user equipment (UE) includes a computer-readable medium. The computer-readable medium includes code for communicating with a second UE, and using a wireless area network air interface during the communication with the second UE. The code for communicating with the second UE includes code for transmitting a downlink signal configured for downlink of the wireless area network air interface.

In an aspect of the disclosure, a computer program product for peer-to-peer wireless communication by a first user equipment (UE) includes a computer-readable medium. The computer-readable medium includes code for communicating with a second UE, and using a wireless area network air interface during the communication with the second UE. The code for communicating with the second UE includes code for processing received uplink signals configured for uplink of the wireless area network air interface.

In an aspect of the disclosure, an apparatus for peer-to-peer wireless communication is provided. The apparatus is a first user equipment (UE) and includes a processing system. The processing system is configured to communicate with a second UE, and to use a wireless area network air interface during the communication with the second UE. To communicate with the second UE, the processing system is configured to transmit a downlink signal configured for downlink of the wireless area network air interface.

In an aspect of the disclosure, an apparatus for peer-to-peer wireless communication is provided. The apparatus is a first user equipment (UE) and includes a processing system. The processing system is configured to communicate with a second UE, and to use a wireless area network air interface during the communication with the second UE. To communicate with the second UE, the processing system is configured to process received uplink signals configured for uplink of the wireless area network air interface.

DETAILED DESCRIPTION

Figure 1:
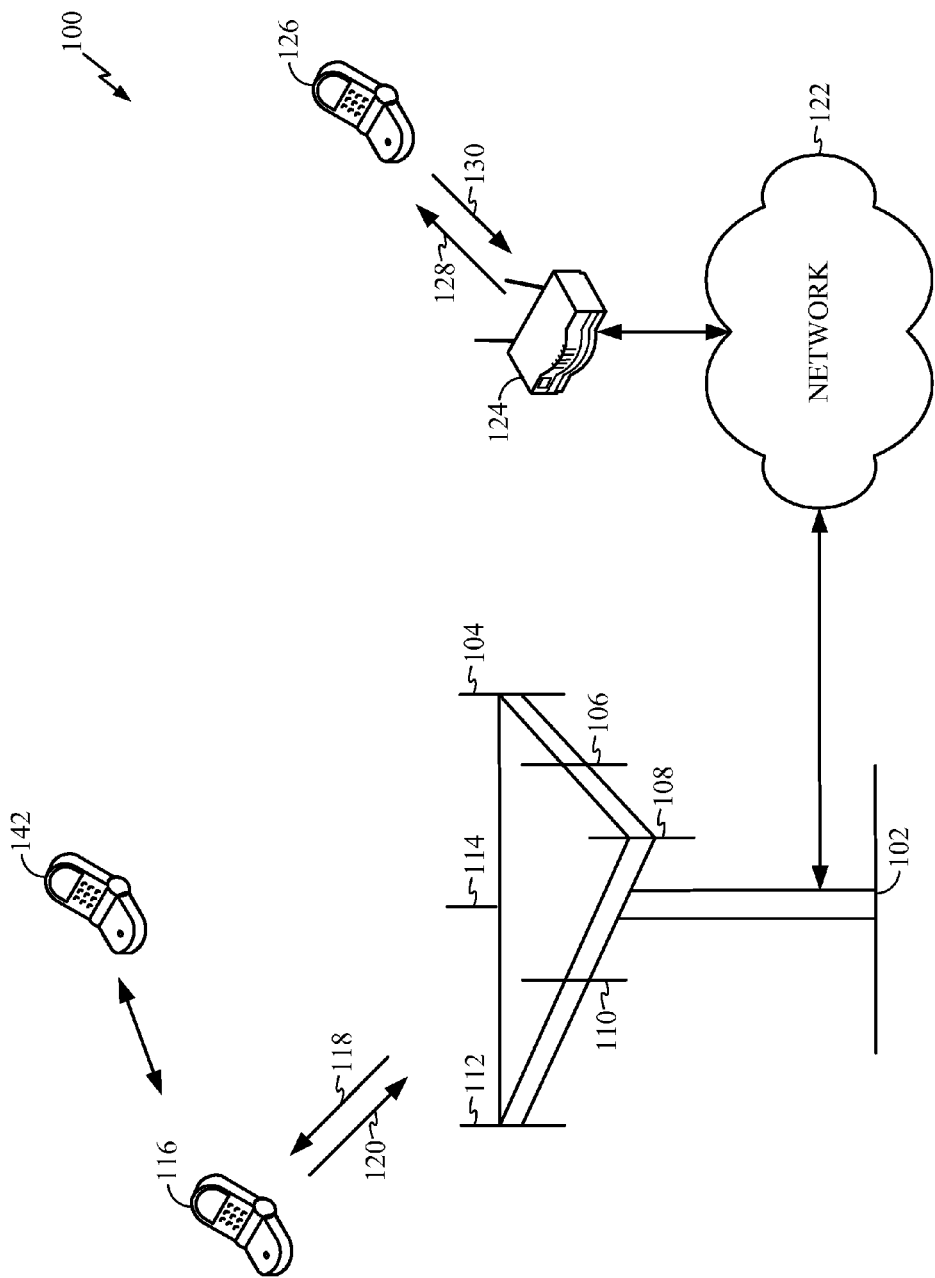
FIG. 1 illustrates a multiple access wireless communication system according to one embodiment.

In the following description, for purposes of explanation, numerous specific details are set forth in-order to provide a thorough understanding of one or more embodiments. It may be evident, however, that such embodiment(s) can be practiced without these specific details. In other instances, well-known structures and devices are shown in block diagram form in-order to facilitate describing one or more embodiments.

As used in this application, the terms "component," "module," and "system" are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a UE. A UE can also be called a mobile device, system, subscriber unit, subscriber station, mobile station, mobile, remote station, remote terminal, access terminal, user terminal, terminal, wireless communication device, user agent, user device, or device. Various embodiments are described herein in connection with a base station. A BS can be utilized for communicating with UEs and can also be referred to as an access point, Node B, evolved Node B (eNode B or eNB), base transceiver station (BTS), or some other terminology.

Moreover, various aspects or features described herein can be implemented as a method, apparatus, or article of manufacture using standard programming and/or engineering techniques. The term "article of manufacture" as used herein is intended to encompass a computer program accessible from any machine-readable device, carrier, or media. Machine-readable media can include but are not limited to magnetic storage devices (e.g., hard disk, floppy disk, magnetic strips), optical disks (e.g., compact disk (CD), digital versatile disk (DVD)), smart cards, flash memory devices (e.g., EPROM, card, stick, key drive), random access memory (RAM), a read only memory (ROM), a programmable ROM (PROM), an erasable PROM (EPROM), registers, a removable disk, a carrier wave, a transmission line, any other suitable storage device, or any other apparatus or means through which the instructions may be transmitted.

The techniques described herein may apply to DL, UL, or both. Furthermore, the techniques described herein may be used for various wireless communication systems such as CDMA, TDMA, FDMA, OFDMA, and SC-FDMA. The terms "system" and "network" are often used interchangeably. A CDMA system may implement a radio technology such as Universal Terrestrial Radio Access (UTRA) or CDMA2000. UTRA includes Wideband-CDMA (W-CDMA) and other variants of CDMA, such as TD-SCDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, or Flash-OFDM. UTRA and E-UTRA are part of Universal Mobile Telecommunication System (UMTS). 3GPP LTE and LTE-Advanced (LTE-A) in both frequency division duplex (FDD) and time division duplex (TDD) modes are releases that use E-UTRA, which employs OFDMA on the downlink, SC-FDMA on the uplink, and multiple-input multiple-output (MIMO) antenna technology to support more users and higher data rates. UTRA, E-UTRA, UMTS, LTE and GSM are described in documents from the 3GPP organization. CDMA2000 and UMB are described in documents from the 3rd Generation Partnership Project 2 (3GPP2) organization.

Referring now to FIG. 1, a wireless communication system 100 is illustrated. The system 100 includes a BS 102 that can include multiple antenna groups. For example, one antenna group can include antennas 104 and 106, another group can include antennas 108 and 110, and an additional group can include antennas 112 and 114. Two antennas are illustrated for each antenna group. However, more or fewer antennas can be utilized for each group. The BS 102 can additionally include a transmitter chain and a receiver chain, each of which can in turn include a plurality of components associated with signal transmission and reception (e.g., processors, modulators, multiplexers, demodulators, demultiplexers, antennas), as will be appreciated by one skilled in the art.

The BS 102 can communicate with one or more UEs such as the UE 116 and the UE 126. However, it is to be appreciated that the BS 102 can communicate with substantially any number of UEs similar to the UEs 116 and 126. The UEs 116 and 126 can be, for example, cellular phones, smart phones, laptops, handheld communication devices, handheld computing devices, satellite radios, global positioning systems, PDAs, and/or any other suitable device for communicating over wireless communication system 100. As depicted, the UE 116 is in communication with the antennas 112 and 114. The antennas 112 and 114 transmit information to the UE 116 over a forward link 118 and receive information from the UE 116 over a reverse link 120. In a frequency division duplex (FDD) system, the forward link 118 can utilize a different frequency band than that used by the reverse link 120, for example. Further, in a time division duplex (TDD) system, the forward link 118 and the reverse link 120 can utilize a common frequency.

Each group of antennas and/or the area in which they are designated to communicate can be referred to as a sector of the BS 102. For example, antenna groups can be designed to communicate to UEs in a sector of the areas covered by the BS 102. In communication over the forward link 118, the transmitting antennas of the BS 102 can utilize beamforming to improve the signal-to-noise ratio (SNR) of the forward link 118 for the UE 116. While the BS 102 utilizes beamforming to transmit to the UE 116 scattered randomly through an associated coverage, UEs in neighboring cells can be subject to less interference as compared to a BS transmitting through a single antenna to all the UEs with which the BS is communicating. The UEs 116 and 126 can also communicate directly with one another using a peer-to-peer or ad hoc technology.

As shown in FIG. 1, the BS 102 can communicate with a network 122, such as a service provider's network, over a backhaul link connection. A femtocell 124 can be provided to facilitate communication with the UE 126 over the forward link 128 and the reverse link 130 (similarly to the forward link 118 and the reverse link 120, as described supra). The femtocell 124 can provide access to one or more UEs 126 much like the BS 102, but on a smaller scale. The femtocell 124 can be configured in a residence, business, and/or other close range setting. The femtocell 124 can connect to the network 122 utilizing a backhaul link connection, which can be over a broadband Internet connection (e.g., T1/T3, digital subscriber line (DSL), cable).

Figure 2:
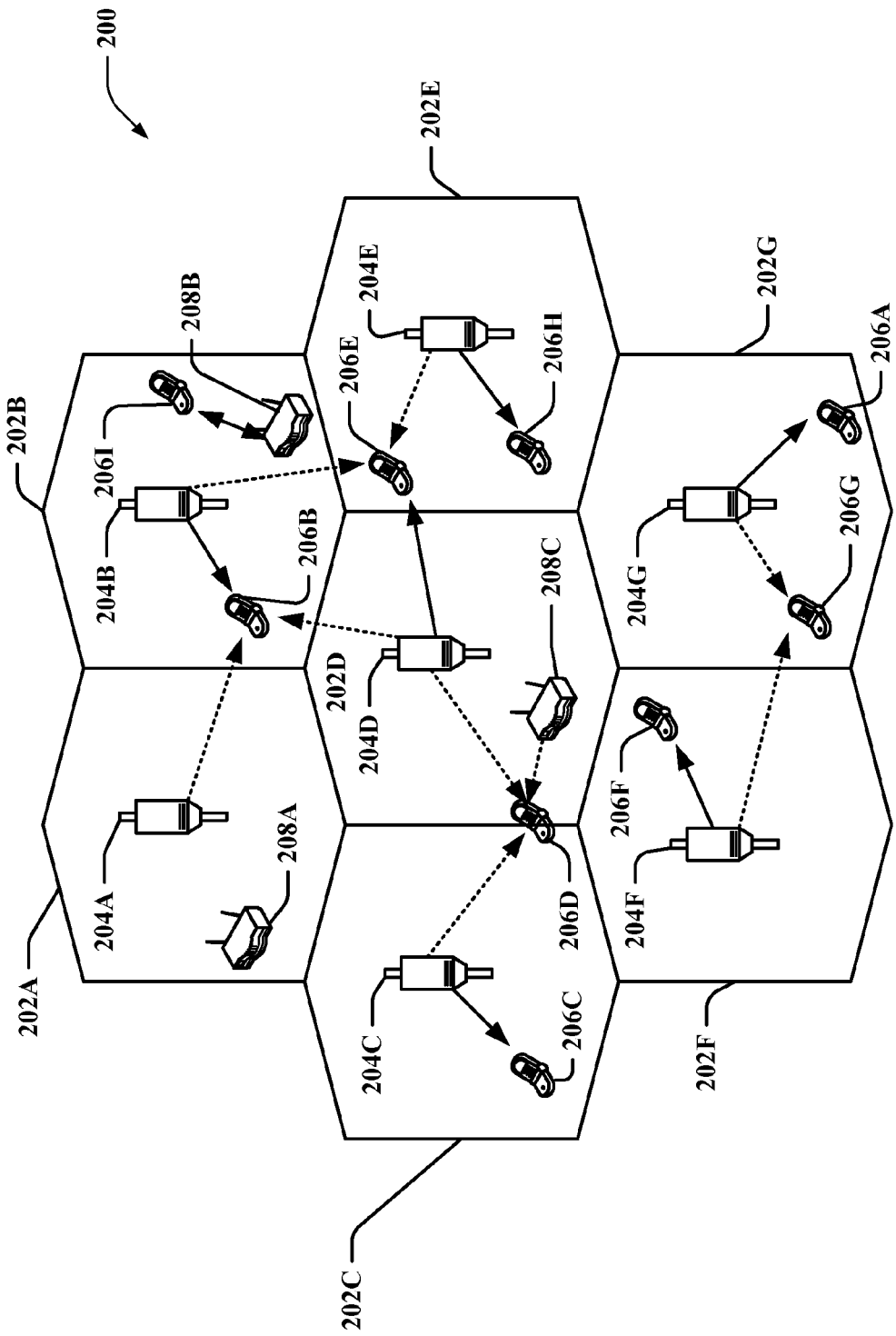
FIG. 2 is an illustration of a wireless communication network.

FIG. 2 is an illustration of a wireless communication network 200 configured to support a number of UEs. The system 200 provides communication for multiple cells, such as for example, macrocells 202A-202G, with each cell being serviced by corresponding BSs 204A-204G. The UEs 206A-206I are shown dispersed at various locations throughout the wireless communication system 200. Each UE 206A-206I can communicate with one or more BSs 204A-204G on a forward link and/or a reverse link, as described. In addition, the femtocells 208A-208C are shown. The UEs 206A-206I can additionally communicate with the femtocells 208A-208C. The wireless communication system 200 can provide service over a large geographic region, with the macrocells 202A-202G covering a broad area and the femtocells 208A-208C providing service in areas such as residences and office buildings. The UEs 206A-206I can establish connection with the BSs 204A-204G and/or the femtocells 208A-208C over the air and/or over a backhaul connection.

Figure 3:
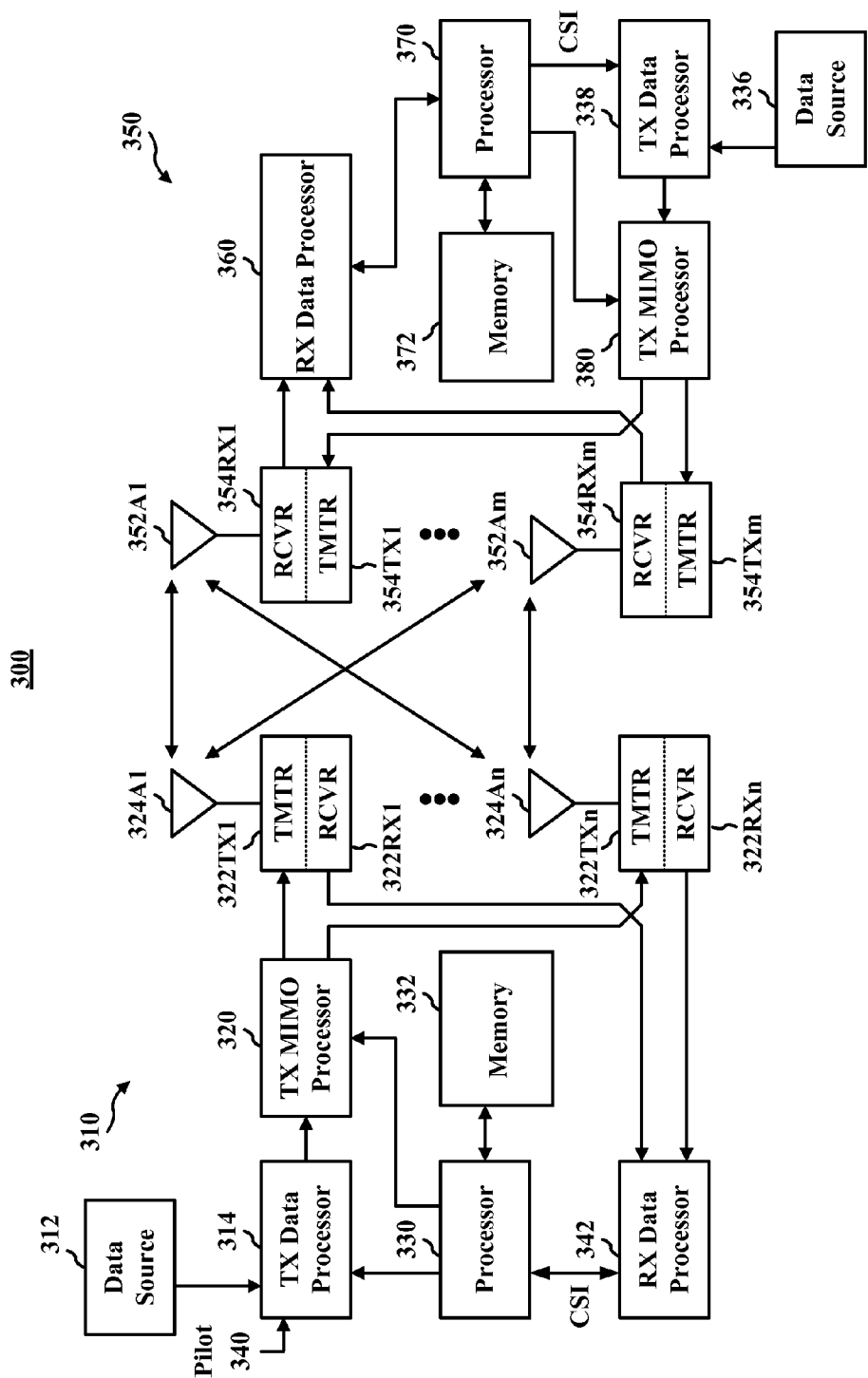
FIG. 3 is a block diagram of a wireless communication system.

FIG. 3 is a block diagram of a wireless communication system 300. The wireless communication system 300 depicts block diagrams for a BS 310 in communication with a UE 350. At BS 310, traffic data for a number of data streams is provided from a data source 312 to a transmit (TX) data processor 314. The TX data processor 314 formats, codes, and interleaves the traffic data stream based on a particular coding scheme selected for that data stream to provide coded data.

The TX data processor 314 may multiplex the coded data for each data stream with pilot data 340 using orthogonal frequency division multiplexing (OFDM) techniques. Additionally or alternatively, the pilot symbols can be frequency division multiplexed (FDM), time division multiplexed (TDM), or code division multiplexed (CDM). The pilot data 340 is typically a known data pattern that is processed in a known manner and can be used at the UE 350 to estimate the channel response. The TX data processor 314 can modulate the multiplexed pilot and coded data for each data stream based on a particular modulation scheme (e.g., binary phase-shift keying (BPSK), quadrature phase-shift keying (QPSK), M-phase-shift keying (M-PSK), M-quadrature amplitude modulation (M-QAM)) selected for that data stream to provide modulation symbols. The data rate, coding, and modulation for each data stream can be determined by instructions performed or provided by the processor 330.

In a BS 310 supporting MIMO communications, the modulation symbols for the data streams can be provided to a TX MIMO processor 320, which provides spatial processing for the modulation symbols (e.g., for OFDM). The TX MIMO processor 320 then provides n modulation symbol streams (or spatial streams) to n transmitters (TMTR) 322TX1 through 322TXn.

Each transmitter 322TX receives and processes a respective symbol stream to provide one or more analog signals, and further conditions (e.g., amplifies, filters, and upconverts) the analog signals to provide a modulated signal suitable for transmission over the MIMO channel. Further, n modulated signals from the transmitters 322TX are transmitted from n antennas 324A1 through 324An, respectively.

At the UE 350, the transmitted modulated signals are received by the m antennas 352A1 through 352Am and the received signal from each antenna 352 is provided to a respective receiver (RCVR) 354RX1 through 354RXm. Each receiver 354RX conditions (e.g., filters, amplifies, and downconverts) a respective signal, digitizes the conditioned signal to provide samples, and further processes the samples to provide a corresponding "received" symbol stream.

An RX data processor 360 can receive and process the m received symbol streams from m receivers 354 based on a particular receiver processing technique to provide n "detected" symbol streams. RX data processor 360 can demodulate, deinterleave, and decode each detected symbol stream to recover the traffic data for the data stream. The processing by RX data processor 360 is complementary to that performed by TX MIMO processor 320 and TX data processor 314 at the BS 310.

The processor 370 can formulate a reverse link message. The reverse link message can include various types of information regarding the communication link and/or the received data stream. The reverse link message is processed and modulated by a TX data processor 338, which also receives traffic data for a number of data streams from a data source 336, and further processed by the TX MIMO processor 380, conditioned by transmitters 354TX, and transmitted back to the BS 310.

The channel response estimate generated by the RX data processor 360 can be used to perform space, space/time processing at the receiver, adjust power levels, change modulation rates or schemes, or other actions. The RX data processor 360 can further estimate the signal-to-noise-and-interference ratios (SNRs) of the detected symbol streams, and possibly other channel characteristics, and provides these quantities to the processor 370. The RX data processor 360 or the processor 370 can further derive an estimate of the "operating" SNR for the system. The processor 370 then provides channel state information (CSI), which can comprise various types of information regarding the communication link and/or the received data stream. For example, the CSI can comprise only the operating SNR. In other embodiments, the CSI can comprise a channel quality indicator (CQI), which can be a numerical value indicative of one or more channel conditions. The CSI is then processed by the TX data processor 338, spatially processed by the TX MIMO processor 380, conditioned by transmitters 354TX1 through 354TXm, and transmitted back to the BS 310.

At the BS 310, the modulated signals from the UE 350 are received by the antennas 324, conditioned by the receivers 322RX, and demodulated and processed by a RX data processor 342 to extract the reverse link message transmitted by the UE 350.

The processors 330 and 370 can direct (e.g., control, coordinate, manage) operation at the BS 310 and the UE 350, respectively. The respective processors 330 and 370 can be associated with a memory 332 and 372 that store program codes and data. The processors 330 and 370 can also perform computations to derive frequency and impulse response estimates for the uplink and downlink, respectively.

Figure 4:
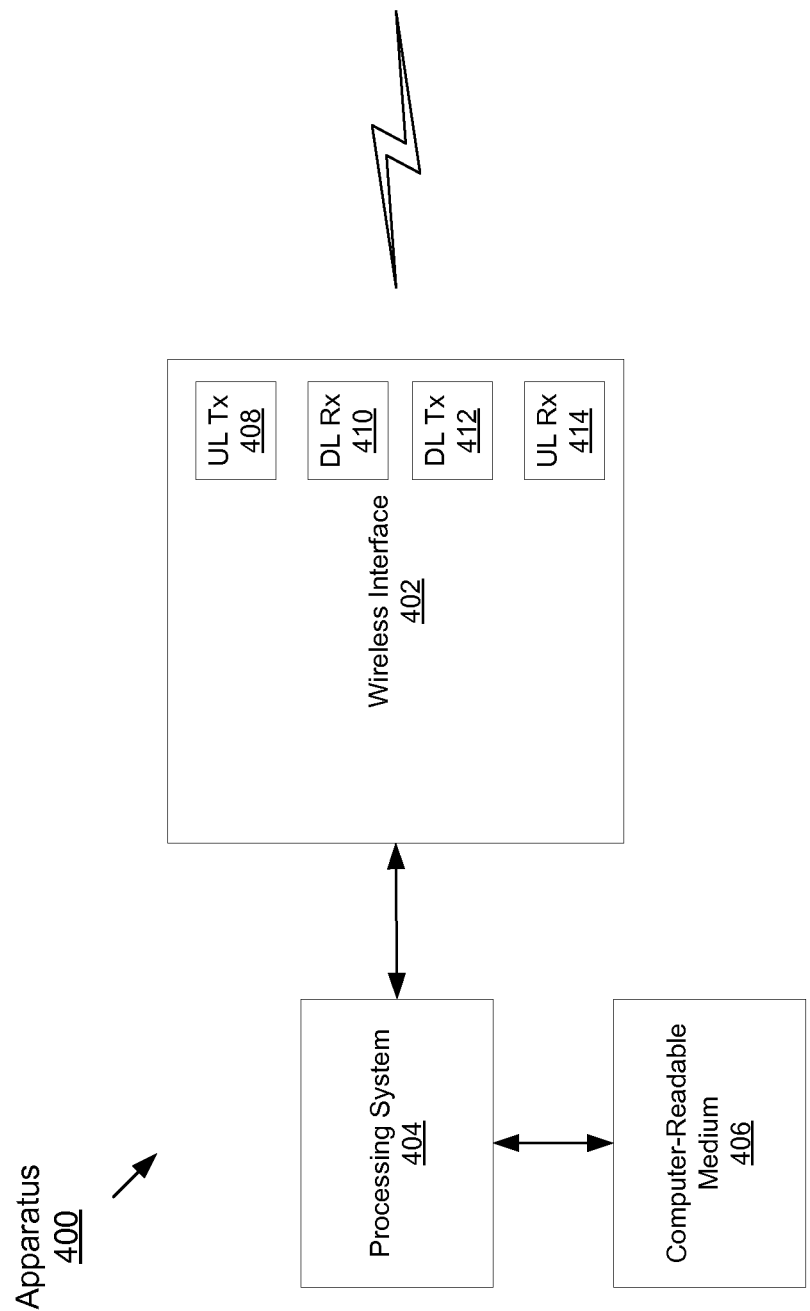
FIG. 4 is a block diagram illustrating a configuration for an apparatus.

FIG. 4 is a conceptual block diagram illustrating a hardware configuration for an exemplary apparatus. The apparatus 400, which is a UE, may include a wireless interface 402, a computer-readable medium 406, and a processing system 404 coupled to the wireless interface 402 and the computer-readable medium 406.

The wireless interface 402 includes an UL transmitter 408, a DL receiver 410, a DL transmitter 412, and an UL receiver 414 for allowing the apparatus 400 to operate as a BS, as a UE, or as both using WAN communication. The UL transmitter 408 and the DL receiver 410 allow the apparatus 400 to operate as a UE in the WAN communication. The DL transmitter 412 and the UL receiver 414 allow the apparatus 400 to operate as a BS in the WAN communication. As such, when the apparatus 400 is in communication with a BS, then the apparatus 400 operates as a UE in the WAN communication with the BS and utilizes the UL transmitter 408 and the DL receiver 410 in the WAN communication. In addition, when the apparatus 400 is in communication with another UE in P2P communication, then the apparatus 400 will utilize the UL transmitter 408 and the DL receiver 410 when the apparatus 400 is operating as a UE for the P2P WAN communication and will utilize the DL transmitter 412 and the UL receiver 414 when the apparatus 400 is operating as a BS for the P2P WAN communication. The apparatus 400 may utilize both sets of transmitters/receivers if the apparatus 400 is operating as a UE in a first WAN communication and as a BS in a second WAN communication. In such a scenario, the apparatus 400 would use time division multiplexing (TDM) between the two operating modes if the frequency bands are overlapping (or sufficiently close to cause interference). However, if the first and second WAN communications are in different frequency bands, then the apparatus 400 may utilize both sets of transmitters/receivers concurrently. The wireless interface 402 is shown as a separate entity. However, as those skilled in the art will readily appreciate, the wireless interface 402, or any portion thereof, may be integrated into the processing system 404, or distributed across multiple entities within the apparatus 400.

The processing system 404 may include one or more processors. The one or more processors may be implemented with any combination of general-purpose microprocessors, microcontrollers, a Digital Signal Processors (DSP), Field Programmable Gate Arrays (FPGA), Programmable Logic Devices (PLD), controllers, state machines, gated logic, discrete hardware components, or any other suitable entities that can perform calculations or other manipulations of information.

The computer-readable medium 406 includes code for performing functions of the processing system 404. That is, the computer-readable medium 406 stores software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system 404 to perform the various functions described below, as well as other protocol processing functions.

The computer-readable medium 406 is shown as a separate entity. However, as those skilled in the art will readily appreciate, the computer-readable medium 406, or any portion thereof, may be integrated into the processing system 404. As such, the processing system 404 may include the computer-readable medium 406 for storing software. Alternatively, the computer-readable medium 406 may be distributed across multiple entities within the apparatus 400.

In one configuration, the apparatus 400 may be a computer program product and include the computer-readable medium 406. The computer-readable medium 406 may be a storage external to the processing system 404, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. The computer-readable medium 406 may also be referred to as machine-readable media. Machine-readable media may include a transmission line or a carrier wave that encodes a data signal. Those skilled in the art will recognize how best to implement the described functionality for the processing system.

Figure 5:
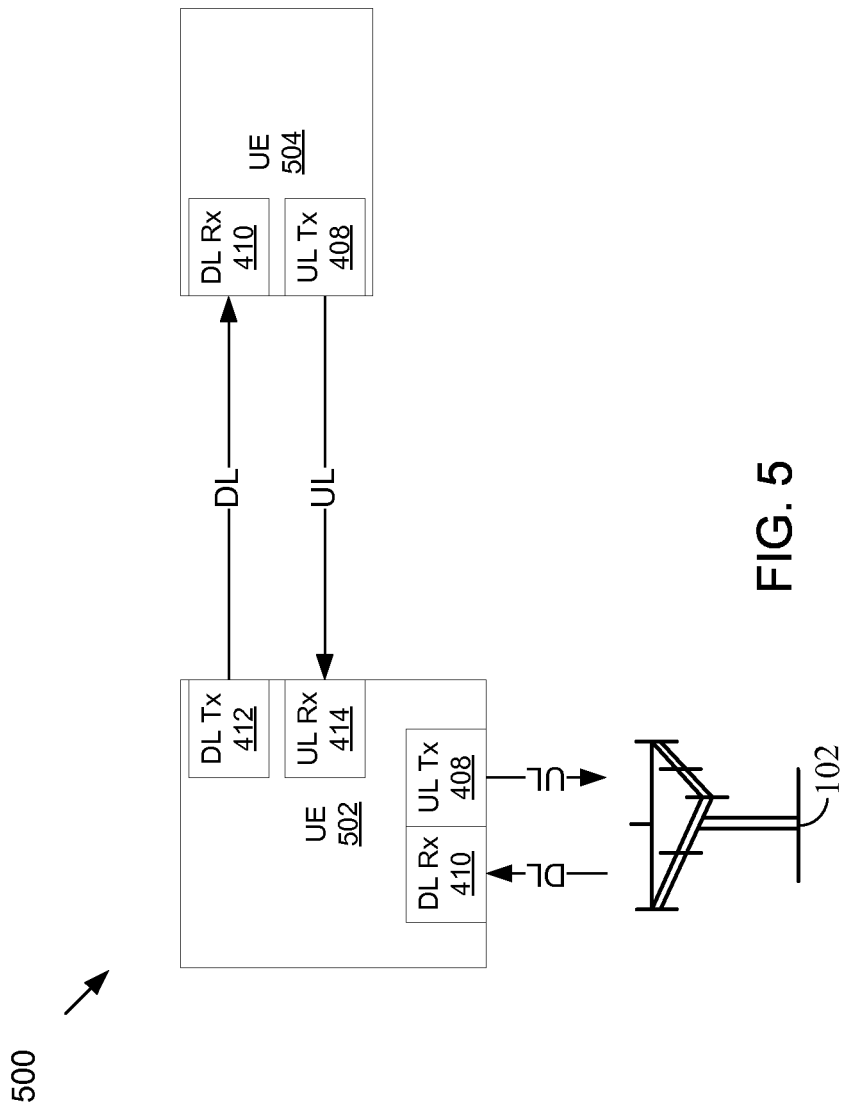
FIG. 5 is a conceptual diagram illustrating communication with a BS and P2P communication using WAN communication.

FIG. 5 is a conceptual diagram 500 illustrating a UE 502 in communication with a BS 102 and in P2P communication with a UE 504 using WAN communication. As shown in FIG. 5, the UE 502 is in P2P communication with the UE 504 using WAN communication and is also in communication with the BS 102 using WAN communication. With respect to the communication with the UE 504, the UE 502 is operating as a BS for the WAN communication, and therefore transmits signals through the DL transmitter 412 to the UE 504 and receives signals through the UL receiver 414 from the UE 504. With respect to the communication with the BS 102, the UE 502 is operating as a UE for the WAN communication, and therefore transmits signals through the UL transmitter 408 to the BS 102 and receives signals through the DL receiver 410 from the BS 102. As such, the UE 502 is configured to operate as both a UE and a BS. The UE 502 may use TDM between the two UE and BS operating modes if the frequency bands overlap. If the frequency bands for the WAN communication do not overlap, the UE 502 may communicate concurrently with the BS 102 and the UE 504. With the UE 502 able to perform P2P communicating using WAN communication, the UE 502 need only implement one air interface for communication with the BS and other UEs, and therefore addresses the aforementioned issues of interoperability when P2P communication occurs in the same spectrum as WAN communication.

When the UE is configured to operate as a BS, the UE is configured to transmit one or more of the signals/information generally transmitted by an eNodeB. For example, the UE may transmit cell-specific reference signals (CRS), a primary synchronization signal (PSS) and a secondary synchronization signal (SSS) on a synchronization channel (SCH), system information on a physical broadcast channel (PBCH), DL data on a physical downlink shared channel (PDSCH), and control information on a physical control format indicator channel (PCFICH), a physical downlink control channel (PDCCH), and a physical HARQ indicator channel (PHICH). In one configuration, a UE may only transmit PSS/SSS for discovery purposes until the UE is asked to enter peer-to-peer mode. In another configuration, a UE may transmit substantially all of the previously mentioned channels while it is in an idle mode. The UE may also receive access probes and process information on a physical random access channel (PRACH), a physical uplink control channel (PUCCH), and a physical uplink shared channel (PUSCH). For example, the UE may process control information on the PUCCH, the control information including channel quality indication (CQI) feedback, scheduling requests (SRs), and Ack/Nack messages. The UE may also process UL data on the PUSCH.

Figure 6:
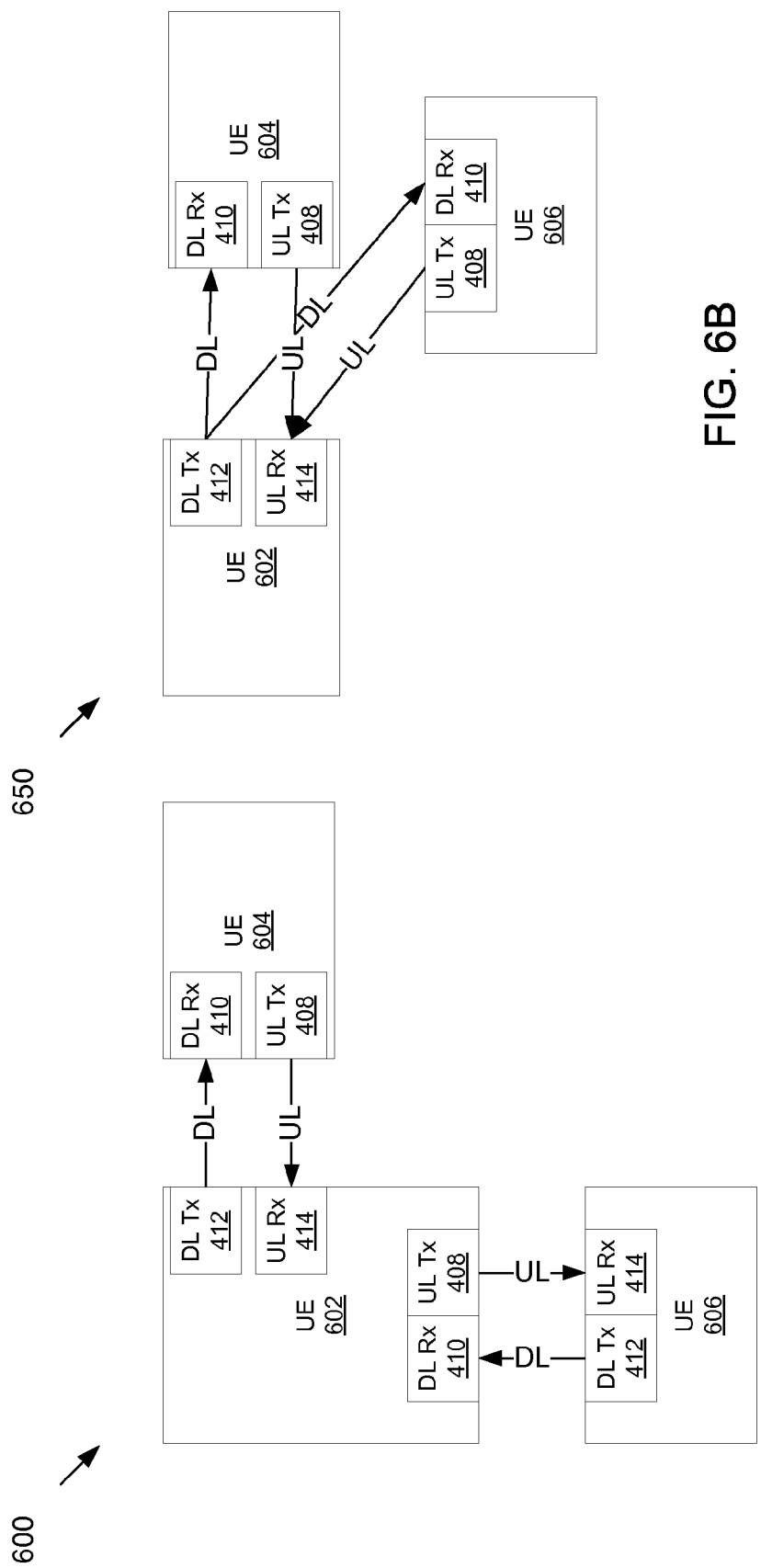
FIG. 6A is a conceptual diagram illustrating P2P communication using WAN communication.
FIG. 6B is another conceptual diagram illustrating P2P communication using WAN communication.

FIG. 6A is a conceptual diagram 600 illustrating P2P communication using WAN communication. As shown in FIG. 6A, the UE 602 is in P2P communication with the UE 604 and the UE 606 using WAN communication. For the P2P communication with the UE 604, the UE 602 is acting as a BS, as the UE 602 receives signals on the UL from the UE 604 and sends signals on the DL to the UE 604. For the P2P communication with the UE 606, the UE 602 is acting as a UE, as the UE 602 receives signals on the DL from the UE 606, which itself is acting as a BS, and sends signals on the UL to the UE 606. As such, the UE 602 is configured to operate as both a UE and a BS for its P2P communication and utilizes the UL transmitter 408 and the DL receiver 410 when operating as a UE and the DL transmitter 412 and the UL receiver 414 when operating as a BS. If the frequency bands for the WAN communication overlap, the UE 602 will use TDM between operating as a BS for the WAN communication with the UE 604 and operating as a UE for the WAN communication with the UE 606.

FIG. 6B is a conceptual diagram 650 illustrating P2P communication using WAN communication. As shown in FIG. 6B, the UE 602 is in P2P communication with the UE 604 and the UE 606 using WAN communication. For the P2P communication with the UE 604, the UE 602 is acting as a BS, as the UE 602 receives signals on the UL from the UE 604, which itself is acting as a UE, and sends signals on the DL to the UE 604. For the P2P communication with the UE 606, the UE 602 is acting as a BS, as the UE 602 receives signals on the UL from the UE 606, which itself is acting as a UE, and sends signals on the DL to the UE 606. As such, the UE 602 is configured to operate as a BS for its P2P communication and utilizes the DL transmitter 412 and the UL receiver 414 for the P2P WAN communication with the UE 604 and the UE 606. In such a configuration, the UE 602 can communicate concurrently with the UE 604 and the UE 606 using frequency division multiplexing (FDM) to assign non-overlapping frequency ranges for each of the WAN communication.

Figure 7:
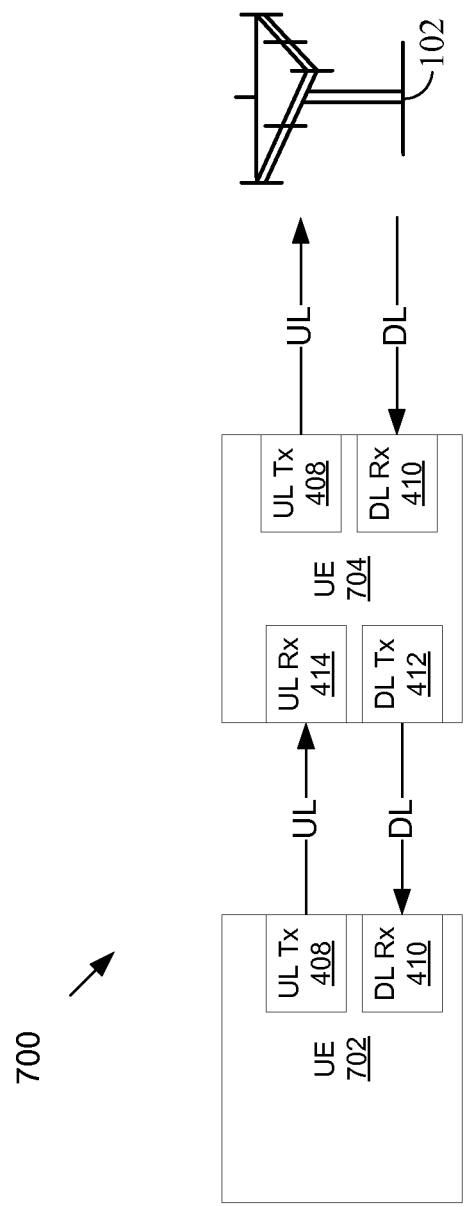
FIG. 7 is a conceptual diagram illustrating P2P communication using WAN communication with a relay.

FIG. 7 is a conceptual diagram 700 illustrating P2P communication using WAN communication with a relay. As shown in FIG. 7, the UE 704 acts as a BS in the P2P WAN communication with the UE 702, utilizing the UL receiver 414 to receive information from the UE 702 and the DL transmitter 412 to transmit information from the BS 102 to the UE 702. The UE 704 relays information between the UE 702 and the BS 102, utilizing the UL transmitter 408 and the DL receiver 410 for WAN communication with the BS 102. Assuming the frequency bands for the WAN communication overlap, the UE 704 will use TDM between operating as a BS for the P2P WAN communication with the UE 702 and operating as a UE for the WAN communication with the BS 102.

Figure 8:
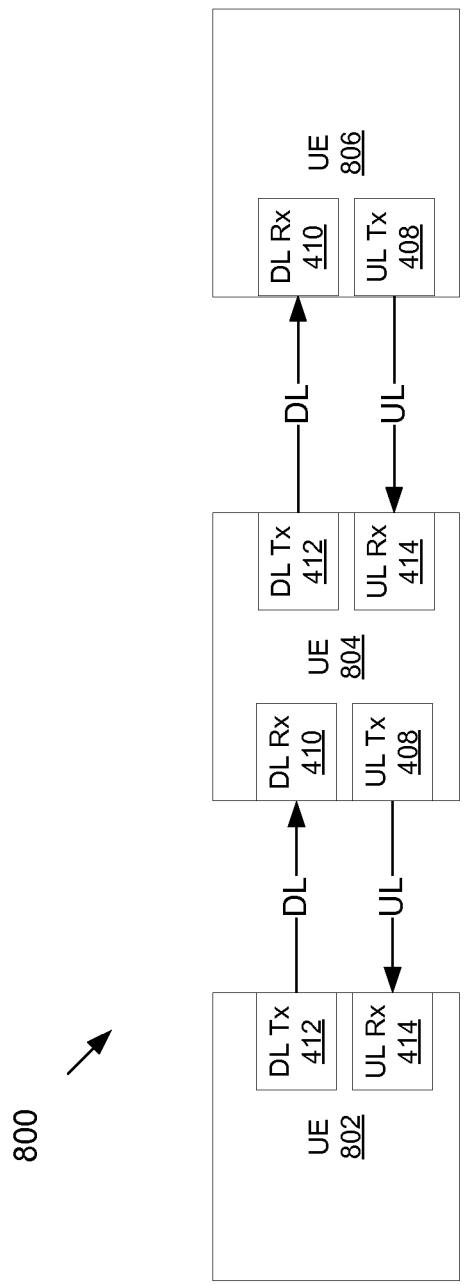
FIG. 8 is another conceptual diagram illustrating P2P communication using WAN communication with a relay.

FIG. 8 is another conceptual diagram 800 illustrating P2P communication using WAN communication with a relay. As shown in FIG. 8, the UE 804, which is relaying information between the UE 802 and the UE 806, may act as a BS with respect to the WAN communication with the UE 806 and as a UE with respect to the WAN communication with the UE 802, which itself is operating as a BS. In such a configuration, the UE 804 uses TDM between the two operating modes if the frequency bands for the WAN communication overlap.

Figure 9:
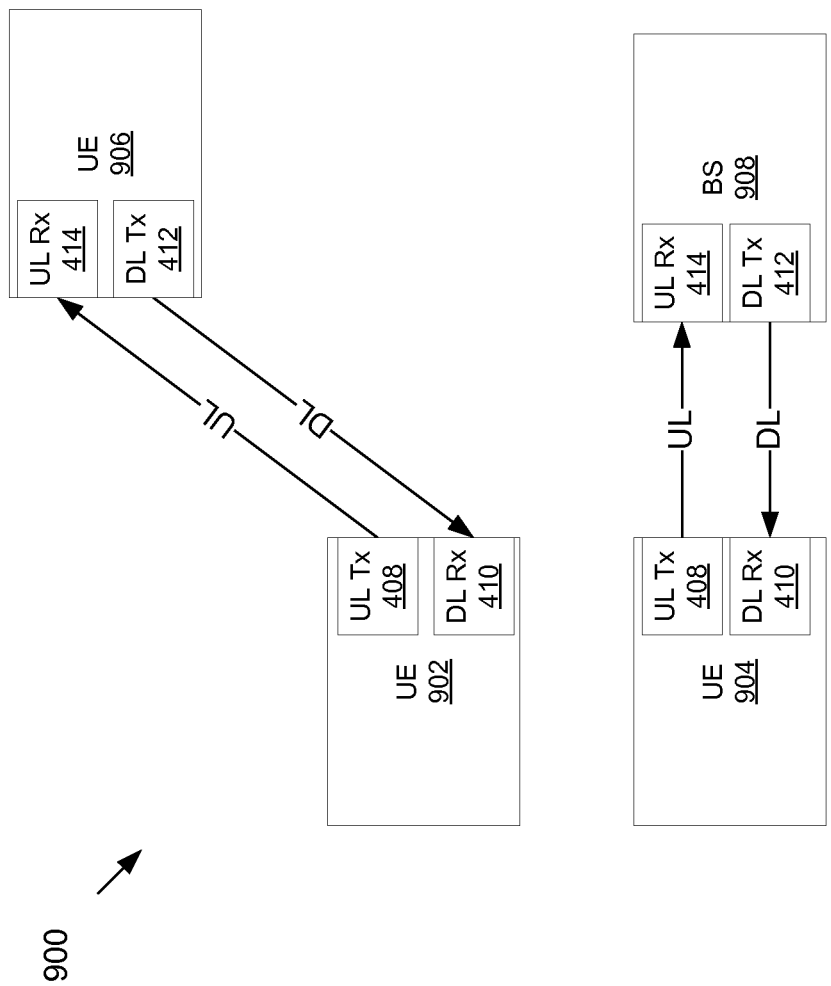
FIG. 9 is another conceptual diagram illustrating P2P communication using WAN communication.

FIG. 9 is another conceptual diagram 900 illustrating P2P communication using WAN communication. When two UEs enter into P2P communication using WAN communication, one UE must act as a UE and another as a BS. In one configuration, the first UE to attempt communication with the other UE may act as a UE while the other acts as a BS. In another configuration, the first UE to attempt communication with the other UE may act as a BS while the other acts as a UE. In another configuration, the choice on whether to act as a UE or a BS depends on the interference conditions that the P2P link would create. For example, if the UE 902 is very close to the UE 904 that is acting as a UE and is receiving on the DL from the BS 908, then the UE 902 may also act as a UE and transmit on the UL to the UE 906. That is, the UE 902 will choose to transmit on the UL bandwidth because the UE 904, which is close by, is receiving on the DL bandwidth. If the UE 902 chose instead to transmit on the DL bandwidth, the transmission by the UE 902 would cause interference in the reception of the signal from the BS 908, which is being received on the DL bandwidth by the UE 904. Such a configuration is like implementing a frequency reuse scheme.

The P2P communication may create dominant interference conditions in which the received power from a UE's serving eNodeB (or UE in a P2P context) may be much lower than that of its dominant interferer. Such interference can occur to a third UE when a first UE starts transmitting in the DL frequency band to a second UE in a peer-to-peer manner, and the third UE near the first UE is receiving DL transmissions from its macro eNodeB. Similarly, such interference can occur to a first UE when the first UE is attempting to receive P2P communications from a second UE in the UL frequency band while a third UE near the first UE is transmitting to its macro eNodeB (potentially at a much higher power because its macro eNodeB is far away). As the P2P communication may create dominant interference conditions, techniques used to solve such interference problems can be used. In one configuration, a bandwidth that is part of the WAN UL or DL bandwidth may be used for P2P communication. WAN-specific signaling mechanisms (such as a scheduling request in LTE) may be used to reserve the bandwidth. Alternatively, some bandwidth may be pre-reserved using, for example, the multicast broadcast single frequency network (MBSFN) mode in LTE.

The UE may make use of part of the WAN UL or DL spectrum to transmit discovery pilots. The UE may transmit these pilots at certain times and tune away to receive them at other times. The pilot waveform may be identical to the pilots transmitted by BSs (e.g., primary synchronization signal (PSS) and secondary synchronization signal (SSS) in LTE), but may be transmitted at a much lower periodicity to help reduce the battery power consumption of the UE. All UEs need not transmit pilots all the time. In a UE relay application, only active UEs may transmit the pilots (e.g., on UL). Idle UEs may monitor the pilots of the active UEs and may determine that they can help an active UE achieve better capacity and inform a BS or the active UE accordingly.

Figure 10:
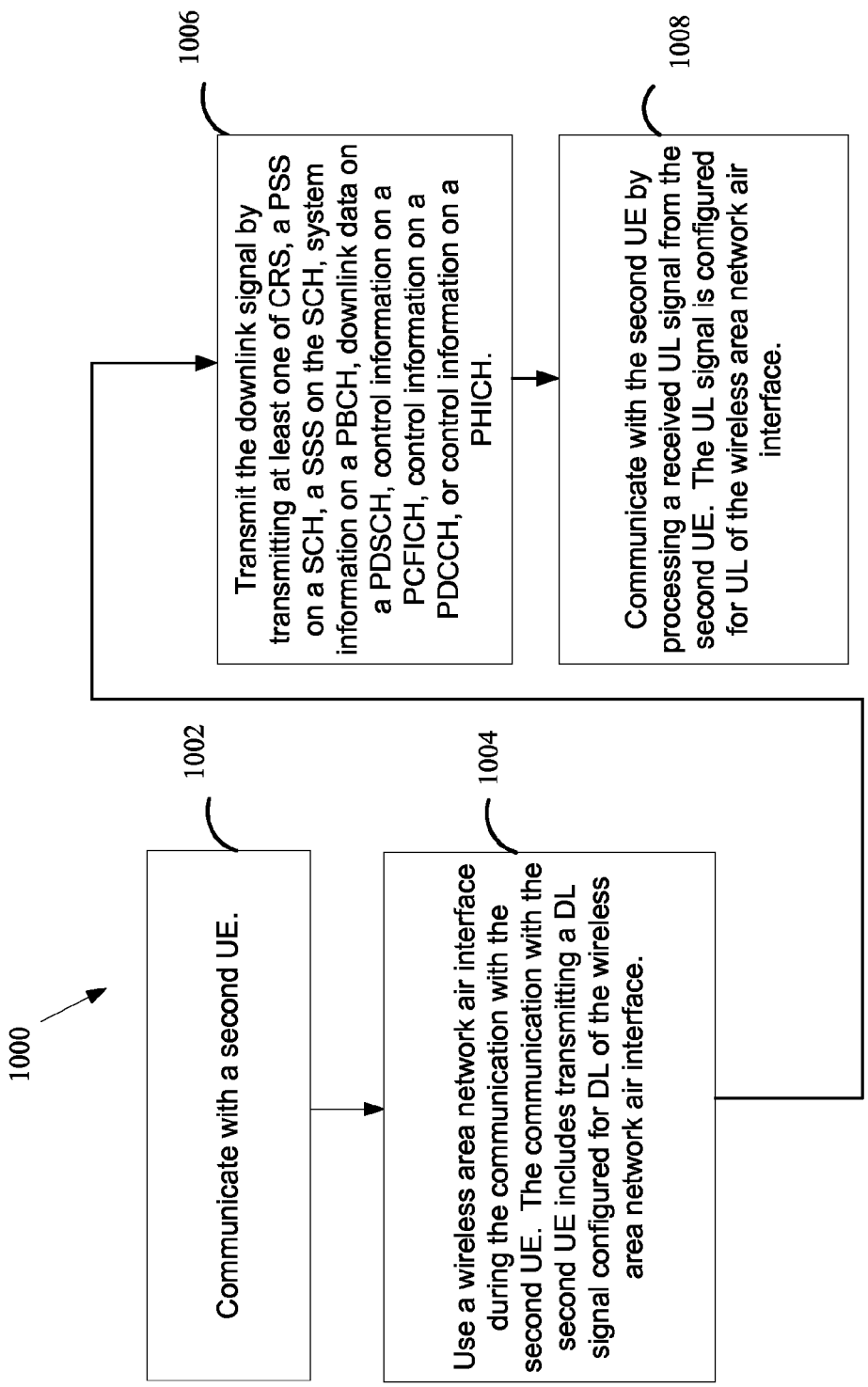
FIG. 10 is a flow chart of a method of wireless communication.

FIG. 10 is a flow chart 1000 of a method of wireless communication. The method includes communicating with a second UE (1002) and using a wireless area network air interface during the communication with the second UE (1004). The communicating with the second UE includes transmitting a downlink signal configured for downlink of the wireless area network air interface (1004). The method may further include transmitting the downlink signal by transmitting at least one of cell-specific reference signals (CRS), a primary synchronization signal (PSS) on a synchronization channel (SCH), a secondary synchronization signal (SSS) on the SCH, system information on a physical broadcast channel (PBCH), downlink data on a physical downlink shared channel (PDSCH), control information on a physical control format indicator channel (PCFICH), control information on a physical downlink control channel (PDCCH), or control information on a physical HARQ indicator channel (PHICH) (1006). In addition, the method may further include communicating with the second UE by processing a received uplink signal from the second UE (1008). The uplink signal is configured for uplink of the wireless area network air interface.

Figure 11:
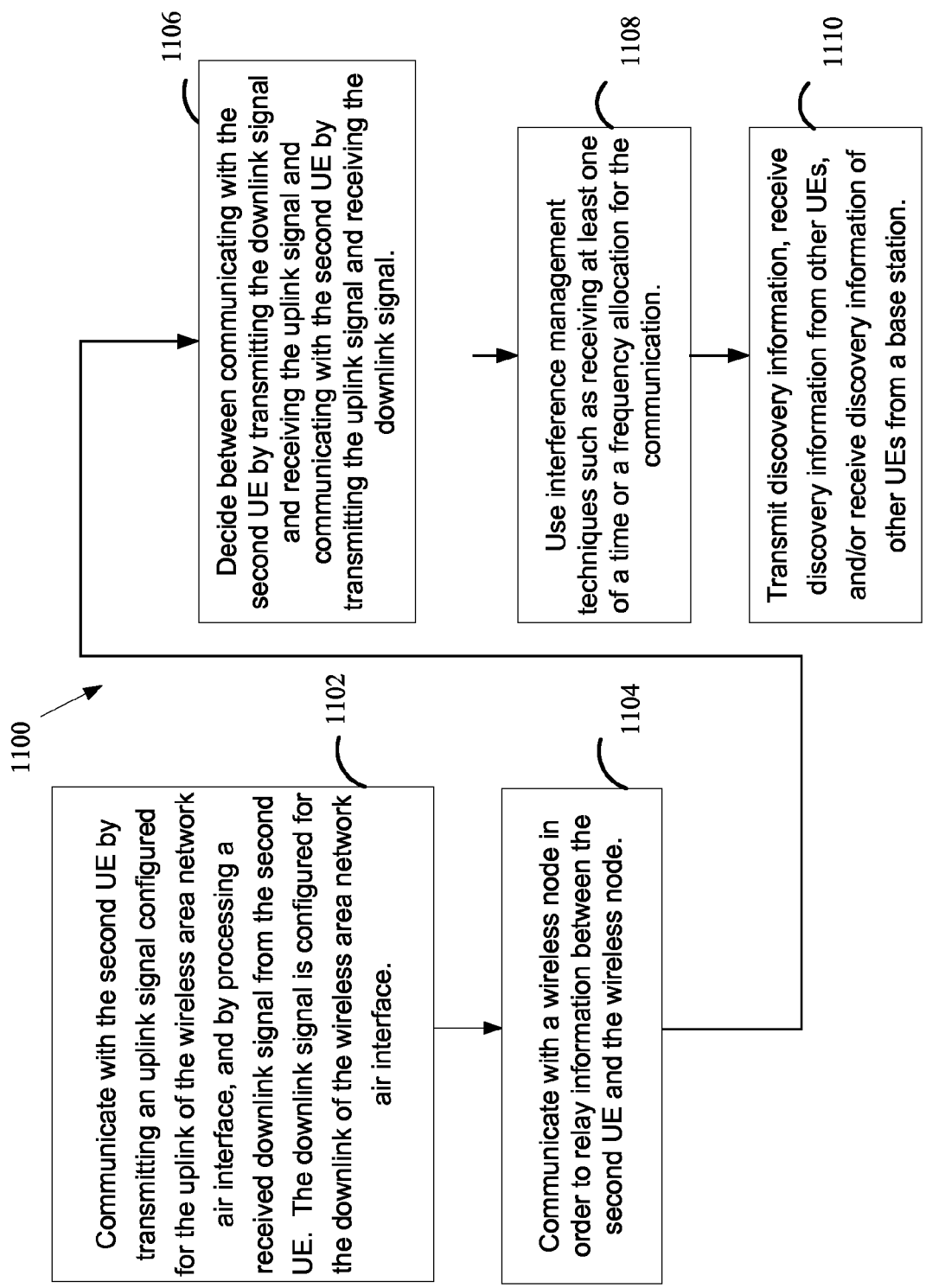
FIG. 11 is another flow chart of a method of wireless communication.

FIG. 11 is another flow chart 1100 of a method of wireless communication. The method may further include communicating with the second UE by transmitting an uplink signal configured for the uplink of the wireless area network air interface, and by processing a received downlink signal from the second UE (1102). The downlink signal is configured for the downlink of the wireless area network air interface (1102). The method may further include communicating with a wireless node in order to relay information between the second UE and the wireless node (1104). In addition, the method may further include deciding between communicating with the second UE by transmitting the downlink signal and receiving the uplink signal and communicating with the second UE by transmitting the uplink signal and receiving the downlink signal (1106). Furthermore, the method may include using interference management techniques such as receiving at least one of a time or a frequency allocation for the communication (1108). According to the method, the UE may transmit discovery information, receive discovery information from other UEs, and/or receive discovery information of other UEs from a base station (1110).

Figure 12:
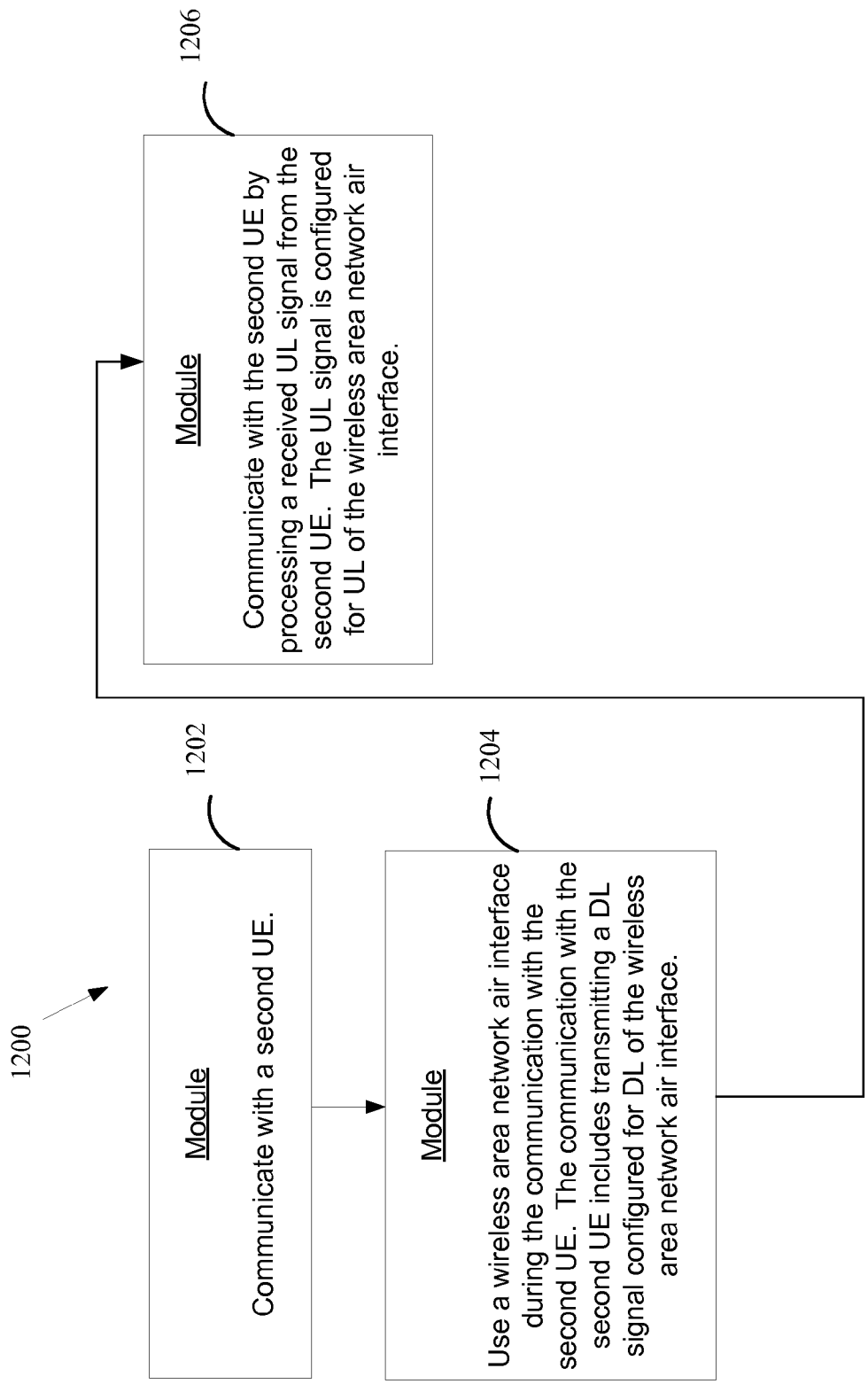
FIG. 12 is a conceptual block diagram illustrating the functionality of an exemplary apparatus.

FIG. 12 is a conceptual block diagram 1200 illustrating the functionality of an exemplary UE apparatus 400. The apparatus 400 includes a module 1202 that is configured to communicate with a second UE. The apparatus 400 further includes a module 1204 that is configured to use a wireless area network air interface during the communication with the second UE (1204). The communication with the second UE includes transmitting a DL signal configured for the DL of the wireless area network air interface (1204). In one configuration, the wireless area network air interface is the wireless wide-area network (wireless WAN or WWAN) air interface. The WAN air interface can be (1) FDD LTE in paired spectrum, (2) TDD LTE in unpaired spectrum, or (3) TDD LTE in the UL band of a paired spectrum. The apparatus 400 may further include a module 1206 that is configured to communicate with the second UE by processing a received UL signal from the second UE (1206). The UL signal is configured for the UL of the wireless area network air interface (1206). The apparatus 400 may be configured to communicate with a wireless node in order to relay information between the second UE and the wireless node. The apparatus 400 may decide whether to operate as a BS or a UE based on whether the communication with the second UE would cause interference to another UE. Alternatively, the apparatus 400 may decide whether to operate as a BS or a UE based on which of the first UE or the second UE initiated the communication. In one configuration, the apparatus 400 is configured to use interference management techniques such as receiving time and/or frequency allocation for the communication. The allocation for the communication may be by BS. Alternatively, the allocation for the communication may be pre-reserved. The apparatus 400 may be further configured to transmit discovery information and to receive discovery information from other UEs. The apparatus 400 may be configured to transmit the discovery information infrequently in order to conserve battery power. The apparatus 400 may additionally be configured to receive discovery information of other UEs from a BS.

In one configuration, the apparatus 400 for wireless communication includes means for communicating with a second UE, and means for using a wireless area network air interface during the communication with the second UE. The means for communicating with the second UE transmits a downlink signal configured for downlink of the wireless area network air interface. In another configuration, the apparatus 400 includes means for communicating with a second UE, and means for using a wireless area network air interface during the communication with the second UE. The means for communicating with the second UE processes received uplink signals configured for uplink of the wireless area network air interface. The aforementioned means is the processing system 404 configured to perform the functions recited by the aforementioned means.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. A claim that recites at least one of a combination of elements (e.g., "at least one of A, B, or C") refers to one or more of the recited elements (e.g., A, or B, or C, or any combination thereof). All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for peer-to-peer wireless communication by a first user equipment (UE), comprising:
determining, by the first UE, whether to communicate with a second UE via a first uplink signal or a first downlink signal based on whether the first downlink signal to the second UE would cause interference to a third UE that is receiving a second downlink signal from a base station;
when the first UE communicates with the second UE via the first downlink signal:
transmitting, by the first UE to the second UE, the first downlink signal comprising at least a cell-specific reference signals (CRSs), a primary synchronization signal (PSS) on a synchronization channel (SCH), a secondary synchronization signal (SSS) on the synchronization channel, system information on a physical broadcast channel (PBCH), downlink data on a physical downlink shared channel (PDSCH), control information on a physical control format indicator channel (PCFICH), control information on a physical downlink control channel (PDCCH), control information on a physical HARQ indicator channel (PHICH), or a combination thereof;

receiving, at the first UE from a wireless node that is different from the second UE, a third downlink signal comprising information to be transmitted from the first UE to the second UE; and transmitting, by the first UE, the received information to the second UE.

2. The method of claim 1, further comprising receiving a second uplink signal from the second UE when the first UE communicates with the second UE via the first downlink signal.

3. The method of claim 2, further comprising transmitting a third uplink signal to the wireless node when the first UE communicates with the second UE via the first downlink signal.

4. The method of claim 3, further comprising communicating with the wireless node to relay information between the second UE and the wireless node when the first UE communicates with the second UE via the first downlink signal.

5. The method of claim 3, further comprising communicating with a wireless node by transmitting the second uplink signal and receiving the third downlink signal when the first UE communicates with the second UE via the downlink signal.

6. The method of claim 5, wherein the determining is further based on which of the first UE or the second UE initiated the communication.

7. The method of claim 1, further comprising using interference management techniques comprising receiving at least one of a time or a frequency allocation for the communication.

8. The method of claim 7, wherein the allocation is by a base station.

9. The method of claim 7, wherein the allocation is pre-reserved.

10. The method of claim 1, further comprising transmitting discovery information.

11. The method of claim 10, further comprising receiving discovery information from other UEs.

12. The method of claim 10, wherein the transmitting is performed infrequently to conserve battery power.

13. The method of claim 1, further comprising receiving discovery information of other UEs.

14. A method for peer-to-peer wireless communication by a first user equipment (UE), comprising:

determining, by the first UE, whether to communicate with a second UE via a first uplink signal or a first downlink signal based on whether the first downlink signal to the second UE would cause interference to a third UE that is receiving a second downlink signal from a base station;

when the first UE communicates with the second UE via the first downlink signal:

receiving, at the first UE from the second UE, a second uplink signal comprising at least a physical random access channel (PRACH), control information on a physical uplink control channel (PUCCH), uplink data on a physical uplink shared channel (PUSCH), or a combination thereof;

receiving, at the first UE from a wireless node that is different from the second UE, a third downlink signal comprising information to be transmitted from the first UE to the second UE; and transmitting, by the first UE, the received information to the second UE.

15. An apparatus for peer-to-peer wireless communication by a first user equipment (UE), comprising:

means for determining, by the first UE, whether to communicate with a second UE via a first uplink signal or a first downlink signal based on whether the first downlink signal to the second UE would cause interference to a third UE that is receiving a second downlink signal from a base station;

when the first UE communicates with the second UE via the first downlink signal:

means for transmitting, by the first UE to the second UE, the first downlink signal comprising at least a cell-specific reference signals (CRSs), a primary synchronization signal (PSS) on a synchronization channel (SCH), a secondary synchronization signal (SSS) on the synchronization channel, system information on a physical broadcast channel (PBCH), downlink data on a physical downlink shared channel (PDSCH), control information on a physical control format indicator channel (PCFICH), control information on a physical downlink control channel (PDCCH), control information on a physical HARQ indicator channel (PHICH), or a combination thereof;

means for receiving, at the first UE from a wireless node that is different from the second UE, a third downlink signal comprising information to be transmitted from the first UE to the second UE; and means for transmitting, by the first UE, the received information to the second UE.

16. The apparatus of claim 15, further comprising means for receiving a second uplink signal from the second UE when the first UE communicates with the second UE via the first downlink signal.

17. The apparatus of claim 16, further comprising means for transmitting a third uplink signal to the wireless node when the first UE communicates with the second UE via the first downlink signal.

18. The apparatus of claim 17, further comprising means for communicating with the wireless node to relay information between the second UE and the wireless node.

19. The apparatus of claim 15, further comprising means for transmitting discovery information.

20. The apparatus of claim 19, further comprising means for receiving discovery information from other UEs.

21. The apparatus of claim 19, wherein the means for transmitting discovery information transmits infrequently to conserve battery power.

22. The apparatus of claim 15, further comprising means for receiving discovery information of other UEs.

23. The apparatus of claim 17, further comprising means for communicating with a wireless node by transmitting the second uplink signal and receiving the third downlink signal when the first UE communicates with the second UE via the downlink signal.

24. The apparatus of claim 23, wherein the means for deciding further decides based on which of the first UE or the second UE initiated the communication.

25. The apparatus of claim 24, further comprising means for using interference management techniques, the interference management techniques comprising means for receiving at least one of a time or a frequency allocation for the communication.

26. The apparatus of claim 25, wherein the allocation is by a base station.

27. The apparatus of claim 25, wherein the allocation is pre-reserved.

28. An apparatus for peer-to-peer wireless communication by a first user equipment (UE), comprising:
 means for determining, by the first UE, whether to communicate with a second UE via a first uplink signal or a first downlink signal based on whether the first downlink signal to the second UE would cause interference to a third UE that is receiving a second downlink signal from a base station;
 when the first UE communicates with the second UE via the first downlink signal:
  means for receiving, at the first UE from the second UE, a second uplink signal comprising at least a physical random access channel (PRACH), control information on a physical uplink control channel (PUCCH), uplink data on a physical uplink shared channel (PUSCH), or a combination thereof;
  means for receiving, at the first UE from a wireless node that is different from the second UE, a third downlink signal comprising information to be transmitted from the first UE to the second UE; and
  means for transmitting, by the first UE, the received information to the second UE.

29. A computer program product for peer-to-peer wireless communication by a first user equipment (UE), comprising:
 a non-transitory computer-readable storage medium comprising code for:
  determining, by the first UE, whether to communicate with a second UE via a first uplink signal or a first downlink signal based on whether the first downlink signal to the second UE would cause interference to a third UE that is receiving a second downlink signal from a base station;
  when the first UE communicates with the second UE via the first downlink signal:
   transmitting, by the first UE to the second UE, the first downlink signal comprising at least a cell-specific reference signals (CRSs), a primary synchronization signal (PSS) on a synchronization channel (SCH), a secondary synchronization signal (SSS) on the synchronization channel, system information on a physical broadcast channel (PBCH), downlink data on a physical downlink shared channel (PDSCH), control information on a physical control format indicator channel (PCFICH), control information on a physical downlink control channel (PDCCH), control information on a physical HARQ indicator channel (PHICH), or a combination thereof;
   receiving, at the first UE from a wireless node that is different from the second UE, a third downlink signal comprising information to be transmitted from the first UE to the second UE; and
   transmitting, by the first UE, the received information to the second UE.

30. The computer program product of claim 29, wherein the code for transmitting further comprises code for receiving a second uplink signal from the second UE when the first UE communicates with the second UE via the first downlink signal.

31. The computer program product of claim 29, wherein the non-transitory computer-readable storage medium further comprises code for using interference management techniques, the interference techniques comprising receiving at least a time or a frequency allocation for the communication.

32. The computer program product of claim 29, wherein the non-transitory computer-readable storage medium further comprises code for transmitting discovery information.

33. The computer program product of claim 29, wherein the non-transitory computer-readable storage medium further comprises code for receiving discovery information of other UEs.

34. A computer program product for peer-to-peer wireless communication by a first user equipment (UE), comprising:
 a non-transitory computer-readable storage medium comprising code for:
  determining, by the first UE, whether to communicate with a second UE via a first uplink signal or a first downlink signal based on whether the first downlink signal to the second UE would cause interference to a third UE that is receiving a second downlink signal from a base station;
  when the first UE communicates with the second UE via the first downlink signal:
   receiving, at the first UE from the second UE, a second uplink signal comprising at least a physical random access channel (PRACH), control information on a physical uplink control channel (PUCCH), uplink data on a physical uplink shared channel (PUSCH), or a combination thereof;
   receiving, at the first UE from a wireless node that is different from the second UE, a third downlink signal comprising information to be transmitted from the first UE to the second UE; and
   transmitting, by the first UE, the received information to the second UE.

35. An apparatus for peer-to-peer wireless communication, the apparatus being a first user equipment (UE) and comprising:
 a processing system configured to:
  determine, by the first UE, whether to communicate with a second UE via a first uplink signal or a first downlink signal based on whether the first downlink signal to the second UE would cause interference to a third UE that is receiving a second downlink signal from a base station;
  when the first UE communicates with the second UE via the first downlink signal:
   transmit, by the first UE to the second UE, the first downlink signal comprising at least a cell-specific reference signals (CRSs), a primary synchronization signal (PSS) on a synchronization channel (SCH), a secondary synchronization signal (SSS) on the synchronization channel, system information on a physical broadcast channel (PBCH), downlink data on a physical downlink shared channel (PDSCH), control information on a physical control format indicator channel (PCFICH), control information on a physical downlink control channel (PDCCH), control information on a physical HARQ indicator channel (PHICH), or a combination thereof;
   receive, at the first UE from a wireless node that is different from the second UE, a third downlink signal comprising information to be transmitted from the first UE to the second UE; and
   transmit, by the first UE, the received information to the second UE.

36. The apparatus of claim 35, wherein, the processing system is further configured to receive a second uplink signal from the second UE when the first UE communicates with the second UE via the first downlink signal, the uplink signal being configured for uplink of the wireless area network air interface.

37. The apparatus of claim 35, wherein the processing system is further configured to use interference management techniques, the interference management techniques comprising receiving at least one of a time or a frequency allocation for the communication.

38. The apparatus of claim 35, wherein the processing system is further configured to transmit discovery information.

39. The apparatus of claim 35, wherein the processing system is further configured to receive discovery information of other UEs.

40. An apparatus for peer-to-peer wireless communication, the apparatus being a first user equipment (UE) and comprising:
- a processing system configured to:
  - determine, by the first UE, whether to communicate with a second UE via a first uplink signal or a first downlink signal based on whether the first downlink signal to the second UE would cause interference to a third UE that is receiving a second downlink signal from a base station;
  - when the first UE communicates with the second UE via the first downlink signal:
    - receive, at the first UE from the second UE, a second uplink signal comprising at least a physical random access channel (PRACH), control information on a physical uplink control channel (PUCCH), uplink data on a physical uplink shared channel (PUSCH), or a combination thereof; and
    - receive, at the first UE from a wireless node that is different from the second UE, a third downlink signal comprising information to be transmitted from the first UE to the second UE; and
    - transmit, by the first UE, the received information to the second UE.

* * * * *